United States Patent
Sutehall et al.

(10) Patent No.: US 7,049,507 B2
(45) Date of Patent: May 23, 2006

(54) AERIAL CABLE INSTALLATION AND AERIAL CABLE SUSPENSION DEVICE THEREFOR

(75) Inventors: Ralph Sutehall, Gwent (GB); Jason Pedder, Bavaria (DE); Mark Attwell, Gwent (GB)

(73) Assignee: Pirelli General plc, London (GB)

( * ) Notice: Subject to any disclaimer, the term of this patent is extended or adjusted under 35 U.S.C. 154(b) by 0 days.

(21) Appl. No.: 10/297,323

(22) PCT Filed: Jun. 6, 2001

(86) PCT No.: PCT/GB01/02488

§ 371 (c)(1),
(2), (4) Date: Jul. 11, 2003

(87) PCT Pub. No.: WO01/95450

PCT Pub. Date: Dec. 13, 2001

(65) Prior Publication Data

US 2003/0234114 A1   Dec. 25, 2003

(30) Foreign Application Priority Data

Jun. 8, 2000   (EP) .................................. 00304880

(51) Int. Cl.
*H02G 7/00*   (2006.01)

(52) U.S. Cl. ................................ 174/40 R; 174/40 CC

(58) Field of Classification Search ............. 174/40 R, 174/40 CC, 42, 43, 44, 45 R See application file for complete search history.

(56) References Cited

U.S. PATENT DOCUMENTS

| | | | | | |
|---|---|---|---|---|---|
| 1,671,659 | A | * | 5/1928 | Varney | ......................... 174/42 |
| 2,984,441 | A | * | 5/1961 | Dalmasso | ..................... 248/63 |
| 3,026,077 | A | * | 3/1962 | Peterson | ....................... 248/63 |
| 3,133,146 | A | * | 5/1964 | House | ........................... 174/42 |
| 3,260,789 | A | * | 7/1966 | Edwards | ....................... 174/42 |
| 5,867,624 | A | * | 2/1999 | Forrester et al. | ............. 385/134 |
| 5,936,197 | A | | 8/1999 | Katoh et al. | |

FOREIGN PATENT DOCUMENTS

| | | | |
|---|---|---|---|
| DE | 3611770 | * | 10/1987 |
| FR | 2443757 A | * | 12/1978 |
| JP | 59-25517 A | * | 2/1984 |

OTHER PUBLICATIONS

Nakamura Jinichiro, "Fixing Device for Saddle Joint," Patent Abstracts of Japan of JP Pub. No. 02199395A (Aug. 7, 1990).

* cited by examiner

*Primary Examiner*—William H. Mayo, III
(74) *Attorney, Agent, or Firm*—Finnegan, Henderson, Farabow, Garrett & Dunner, L.L.P.

(57) ABSTRACT

An aerial cable installation having an aerial cable suspended from a suspension point through a suspension device. This device has a clamp having two saddle members engaging the cable on diametrically opposite sides thereof and a plurality of nut and bolt assemblies extending through aligned holes in flanges of said saddle members for resiliently biasing the saddle members toward each other to clamp against the cable with a selected clamping force. To this end, each nut and bolt assembly includes a helical spring mounted on the bolt thereof between said flanges and the nut of the assembly and the springs are compressed a predetermined amout which is adjustable by tightening or loosening said assemblies.

12 Claims, 2 Drawing Sheets

AERIAL CABLE INSTALLATION AND AERIAL CABLE SUSPENSION DEVICE THEREFOR

CROSS REFERENCE TO RELATED APPLICATIONS

This application is a national phase application based on PCT/GB01/02488, filed Jun. 6, 2001, the content of which is incorporated herein by reference, and claims the priority of European Patent Application No. 00304880.8, filed Jun. 8, 2000, the content of which is incorporated herein by reference.

BACKGROUND OF THE INVENTION

1. Field of the Invention

This invention relates to aerial cable installations and aerial suspension devices therefor.

2. Description of the Related Art

It is known to provide aerial cable installations comprising an aerial cable suspended from a plurality of spaced apart suspension points provided on poles, towers and like upstanding supports. Typically the cable is suspended from the suspension points through respective suspension devices each of which comprises a clamp provided with a suspension eye and comprising two saddle members engaging the cable on diametrically opposite sides thereof and bolted together. One of the functions of the clamp is to apply a clamping force to the cable which allows slippage of the cable through the clamp when the cable is subjected to an unbalanced load in the cable spans immediately adjacent the clamp to reduce this imbalance. The clamping is compression force and the coefficient of friction between the contacting surfaces of the cable and clamp determine the frictional force opposing slippage due to an unbalanced load in the cable spans immediately adjacent the clamp and in a prior art clamp as shown in FIG. 4 of the accompanying drawings the clamping compression force is adjusted during installation by using spacers of a selected thickness (for example 3.3 mm) between the saddle members. In the illustrated prior art clamp 1, which is obtainable from Dulmison of Corby, Northants, England, two saddle members 2 and 3 engage the cable 4 on diametrically opposite sides thereof and are bolted together by respective nut and bolt fastener assemblies 5 which pass through aligned holes in flanges 6 and 7 of the saddle members 2 and 3 with respective spacers 8, in the form of washers, positioned between the flanges 6 and 7. The nut and bolt assemblies 5 are tightened until the flanges 6 and 7 engage with the spacers 8. As will be appreciated the spacers limit further movement of the saddle members towards each other and for a given torque applied to the bolts which bolt the saddle members and spacers together the clamping compression force applied to the cable and thus the frictional force opposing slippage will depend on the actual diameter of the cable and the thickness of the spacers.

We have discovered that the above-described clamp, whilst suitable for use with metallic cables having relatively close tolerance outer diameters (for example ±3%), is not particularly suitable for use with cables such as all-dielectric self-supporting (ADSS) cables which have relatively large tolerance outer diameters (for example ±5%) since the variation in the diameter of a latter cable along its length results in a variation of the force opposing slippage depending upon the actual cable diameter at the location of the clamp along the length of the cable. This problem of diameter variation is exacerbated because an ADSS cable is more compressible than a metallic cable and also requires reinforcing rods to be wound about the cable at the clamping location thereby introducing a further tolerance on the cable diameter.

An object of one aspect of the invention is to avoid dependence of the clamping force and thus the force opposing slippage of the cable in the clamp on the actual diameter of the cable at the location of the clamp.

SUMMARY OF THE INVENTION

The invention includes an aerial cable installation comprising an aerial cable suspended from a plurality of spaced apart suspension points, said cable being suspended from at least one of said suspension points through a suspension device comprising a clamp comprising two saddle members engaging the cable on diametrically opposite sides thereof and an adjustable biasing arrangement biasing the saddle members towards each other to clamp against the cable with a selected clamping force, said saddle members being movable further towards each other but for the presence of the cable therebetween.

Preferably the adjustable biasing arrangement comprises a plurality of nut and bolt assemblies extending through aligned holes in respective flanges of said saddle members, each assembly including a helical spring mounted on the bolt thereof between said flanges and the nut or a bolt head of the assembly, said springs being compressed a predetermined amount which is adjustable by tightening or loosening said assemblies.

It will be understood that instead of nut and bolt assemblies extending through aligned holes in the flanges of the saddle members the adjustable biasing arrangement may comprise a plurality of threaded studs fastened to one of the saddle members and extending through holes in a flange of the other saddle member. In this case, each stud has a helical spring mounted thereon between said flange and a nut threaded on said stud, said springs being compressed a predetermined amount which is adjustable by tightening or loosening said nuts.

The invention also includes a method of compressing to a predetermined length a helical spring in an installation as defined in the last but one paragraph or that installation modified as described in the last paragraph, said method comprising fitting a gauge comprising a tubular body having a radially inwardly extending rim at one end thereof over the spring such that said radially inwardly extending rim of the gauge engages with the end of the spring remote from the or a said flange or a washer beyond said end of the spring in a direction away from said flange, and tightening said assembly until the other end of the tubular body engages said flange.

It will be appreciated that the above method is applicable generally to compressing to a predetermined length a helical spring mounted on a bolt or a stud extending from a surface. In this case, the method comprises fitting a gauge comprising a tubular body having a radially inwardly extending rim at one end thereof over the spring such that said radially inwardly extending rim engages with the end of spring remote from the surface, or a washer beyond said end of the spring in a direction away from said surface, providing a nut on said bolt or stud and tightening said nut and bolt or said nut on said stud until the other end of tubular body engages said surface.

The invention also includes an aerial suspension device comprising a clamp comprising two saddle members for engaging a cable on diametrically opposite sides thereof and a plurality of nut and bolt assemblies each including a helical spring having a plurality of turns, said assemblies being adapted to extend through aligned holes in respective flanges of said saddle members such that said springs bias the saddle members together in use.

BRIEF DESCRIPTION OF THE DRAWINGS

In order that the invention may be well understood an embodiment thereof, which is given by way of example only, together with some modifications will now be described with reference to the accompanying drawings in which.

DETAILED DESCRIPTION OF THE INVENTION

Figure 1:
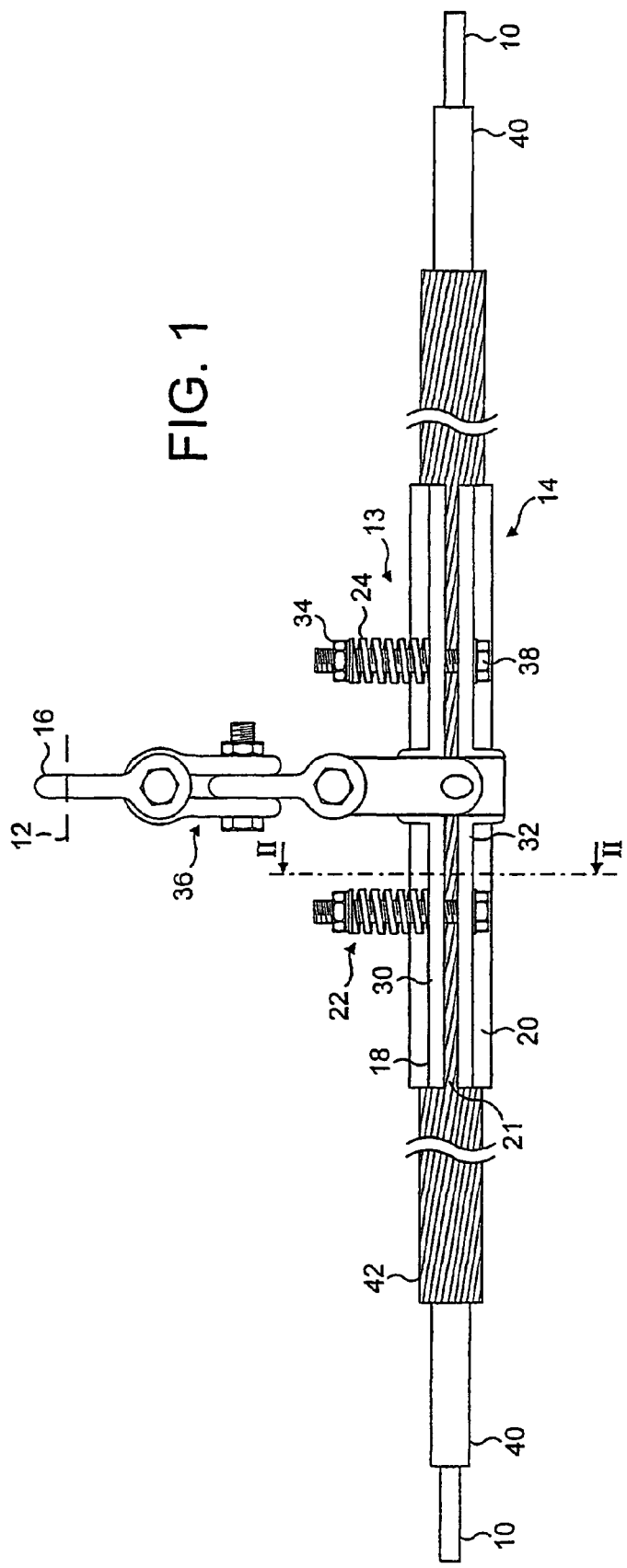
FIG. 1 shows part of an aerial cable installation.

Referring to FIG. 1 there is shown an aerial cable installation comprising an all-dielectric self-supporting (ADSS) cable 10 suspended from a suspension point, schematically indicated by dotted line 12, provided on an upstanding support such as a pole or tower (not shown). As will be understood, the aerial cable 10 is suspended from a plurality of suspension points 12 spaced apart along the cable.

Figure 2:
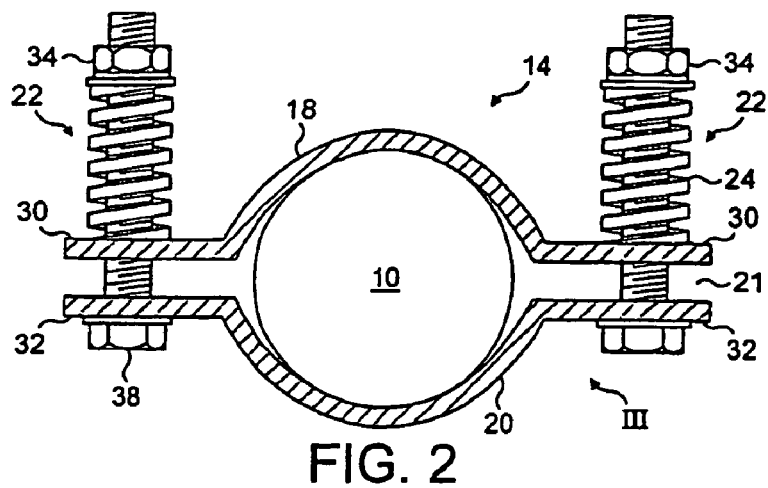
FIG. 2 is a schematic cross-sectional view taken along the line II—II in FIG. 1 and to a larger scale.

The cable is suspended at least one and preferably all or most suspension points through a suspension device 13 comprising a clamp 14 provided with a suspension eye 16 and comprising two saddle members 18, 20 engaging the cable on diametrically opposite sides thereof as better shown in FIG. 2. An adjustable biasing arrangement biases the saddle members 18, 20 towards each other to clamp against the cable with a selected clamping force. This clamping force between the clamp and the cable allows slippage of the cable through the clamp when the cable is subjected to an unbalanced load in the cable spans immediately adjacent the clamp of more than a predetermined amount. When the saddle members clamp against the cable 10 with the selected clamping force a gap 21 remains between the saddle members which would allow the saddle members to move further towards each other but for the presence of the cable 10 between the saddle members. If a smaller diameter cable were clamped in the clamp with the same clamping force the gap 21 between the saddle members would be smaller and if a larger diameter cable were clamped in the clamp with the same clamping force the gap 21 would be larger. Thus, the provision of the gap between the saddle members enables the clamp to apply a selected clamping force to a cable such as an ADSS cable having a large tolerance outer diameter.

The adjustable biasing arrangement may comprise any suitable device or plurality of elements arranged to resiliently bias the saddle members towards each other, and in the disclosed embodiment, the adjustable biasing arrangement comprises nut and bolt assemblies 22 extending through aligned holes 26, 28 (FIG. 3) in respective flanges 30, 32 of the saddle members 18, 20 and including respective helical springs 24. The helical spring 24 in each assembly 22 has a plurality of turns and is mounted on the bolt between the flange 30 of the saddle member 18 and the nut 34 of the assembly. The spring is compressed a predetermined amount by tightening or loosening the assembly.

In the illustrated embodiment four nut and bolt assemblies 22 are provided although three assemblies only are visible in the figures. The assemblies are provided in longitudinally spaced apart pairs, one pair to each side of a central portion of the clamp from which a suspension linkage 36 extends (as shown in FIG. 1) and each pair comprising a respective assembly to each side of the cable 10 (as shown in FIG. 2).

Although not preferred it is to be understood that the bolts in the assemblies 22 could be inverted in which case the helical spring 24 would be mounted on the bolt between the flange 30 and the bolt head 38 rather than between the flanges 30 and the nut 34.

Although also not preferred the bolts in the assemblies of the illustrated embodiments may be replaced with threaded studs fastened to the saddle member 20 and extending through holes 26 in the flange 30 of the other saddle member. It will also be understood that the springs may be replaced by resilient plastics tubes although again this is not preferred.

Referring back to FIG. 1, mechanical reinforcing rods 40, for example of galvanised steel are helically wound about the cable 10 over a length thereof which includes that region of the cable in which the saddle members clamp against the cable. Further, armour rods 42, for example of an aluminum alloy, are helically wound over a portion of the length of cable provided with the reinforcing rods including that region which is to be clamped. To fit the clamp 14 to the cable, the saddle members 18 and 20 are positioned to engage the armour rods 42 of the cable on diametrically opposite sides thereof. The armour rods 42 and reinforcing rods 40 are omitted from FIG. 2 for simplicity. The nut and bolt assemblies are fitted through holes 26 and 28 of flanges 30 and 32 and the assemblies are tightened to compress the springs 24 to bias the saddle members towards each other to clamp against the cable. The assemblies 22 are tightened using a torque wrench to provide a desired clamping force between the clamp 14 and the cable. For example the tightening torque applied to nuts 34 of the assemblies may be 50 Nm to provide a clamping force which allows slippage of the cable when an unbalanced load in the cable spans immediately adjacent the clamp reaches 7 kN to 15 kN.

After the clamp 14 has been fitted to the cable the suspension linkage 36 is attached to the clamp and the suspension eye 16 fitted to the suspension point 12.

Figure 3:
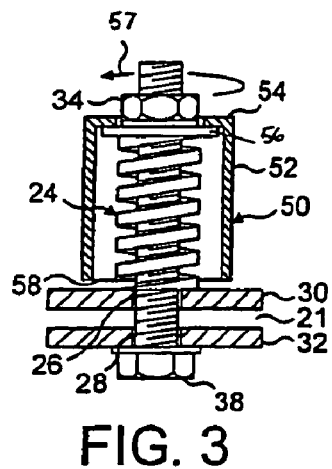
FIG. 3 is a schematic cross-sectional view of a part III of FIG. 2 to a larger scale and showing compression of a spring to a predetermined length.
Figure 4:
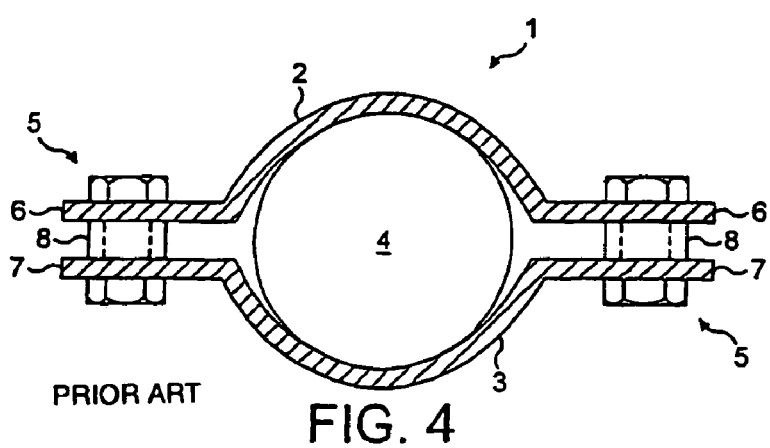
FIG. 4 is a schematic cross-sectional view similar to that of FIG. 2 but of a prior art clamp of known aerial cable installation

As an alternative to using a torque wrench to control tightening of the assemblies 22 to provide a required clamping force, the present invention provides according to another aspect thereof a method of compressing the helical springs 24 in the assemblies 22 to a predetermined length which provides a required clamping force. With reference to FIG. 3, this method uses a gauge 50 comprising a tubular body 52 having a radially inwardly extending rim 54 at one end thereof. The gauge 50 is fitted over the spring 24 of an assembly such that the rim 54 engages with a washer 56 between the end of the spring remote from the flange 30 and the nut 34. The nut 34 is then tightened, as indicated by arrow 57, until the other end 58 of the body 52 engages the flange 30. The gauge is then removed and used on another assembly. In this way, each spring is compressed to a predetermined length, and assuming that the springs 24 used in the assemblies have the same length and spring characteristics, each spring will provide the same, or substantially the same, clamping force.

It will be appreciated that given appropriate diametrical clearances the rim 54 of the gauge could be arranged to engage with the end of the spring remote from the flange 30 in which case the washer 56 would be omitted.

It will also be understood that gauge 50 may be used for any application in which a helical spring mounted on a bolt or a stud extending from a surface is to be compressed to a predetermined length.

The invention claimed is:

1. An aerial cable installation comprising:
   an aerial cable suspended from a plurality of spaced-apart suspension points,
   said cable being suspended from at least one of said suspension points through a suspension device comprising
      a clamp comprising two saddle members engaging the cable on diametrically opposite sides thereof; and
      an adjustable biasing arrangement adapted to resiliently bias the saddle members toward each other to clamp against the cable with a selected clamping force, said saddle members being movable further toward each other but for the presence of the cable therebetween;
   wherein said adjustable biasing arrangement comprises a plurality of nut and bolt assemblies extending through aligned holes in respective flanges of said saddle members, each nut and bolt assembly including a helical spring mounted on the bolt thereof between said flanges and a nut or a bolt head of the assembly, said springs being compressible a predetermined amount to provide the clamping force, the clamping force being adjustable by tightening or loosening the nut and bolt assembly.

2. The aerial cable installation as claimed in claim 1, wherein said cable is an all-dielectric self-supporting cable.

3. The aerial cable installation as claimed in claim 1, wherein said cable is provided with mechanical reinforcement in the region in which said saddle members clamp against the cable.

4. The aerial cable installation as claimed in claim 1, the adjustable biasing arrangement being adapted to resiliently bias the saddle members toward each other to clamp against the cable with a selected clamping force that allows slippage of the cable through the clamp relative to the at least one of said suspension points when the cable is subjected to an unbalanced load of more than a predetermined amount in respective cable spans immediately adjacent the clamp.

5. An aerial cable installation comprising:
   an aerial cable suspended from a plurality of spaced-apart suspension points,
   said cable being suspended from at least one of said suspension points through a suspension device comprising
      a clamp comprising two saddle members engaging the cable on diametrically opposite sides thereof; and
      an adjustable biasing arrangement adapted to resiliently bias the saddle members toward each other to clamp against the cable with a selected clamping force, said saddle members being movable further toward each other but for the presence of the cable therebetween,
   wherein said adjustable biasing arrangement comprises a plurality of threaded studs fastened to one of said saddle members and extending through holes in a flange of the other saddle member, each stud having a helical spring mounted thereon between said flange and a nut threaded on said stud, said springs being compressible a predetermined amount to provide the clamping force, the clamping force being adjustable by tightening or loosening the nut.

6. The aerial cable installation as claimed in claim 5, wherein said cable is an all-dielectric self-supporting cable.

7. The aerial cable installation as claimed in claim 5, wherein said cable is provided with mechanical reinforcement in the region in which said saddle members clamp against the cable.

8. The aerial cable installation as claimed in claim 5, the adjustable biasing arrangement being adapted to resiliently bias the saddle members toward each other to clamp against the cable with a selected clamping force that allows slippage of the cable through the clamp relative to the at least one of said suspension points when the cable is subjected to an unbalanced load of more than a predetermined amount in respective cable spans immediately adjacent the clamp.

9. A method of compressing to a predetermined length a helical spring in an aerial cable installation comprising an aerial cable suspended from a plurality of spaced apart suspension points, said cable being suspended from at least one of said suspension points through a suspension device comprising a clamp comprising two saddle members engaging the cable on diametrically opposite sides thereof and an adjustable biasing arrangement resiliently biasing the saddle members toward each other to clamp against the cable with a selected clamping force, said saddle members being movable further toward each other but for the presence of the cable therebetween, wherein said adjustable biasing arrangement comprises a plurality of nut and bolt assemblies extending through aligned holes in respective flanges of said saddle members, each assembly including a helical spring mounted on the bolt thereof between said flanges and a nut or a bolt head of the assembly, said springs being compressed a predetermined amount which is adjustable by tightening or loosening said assemblies, said method comprising fitting a gauge comprising a tubular body having a radially inwardly extending rim at one end thereof over the spring such that said radially inwardly extending rim of the gauge engages with the end of the spring remote from at least one of said flanges or a washer beyond said end of the spring in a direction away from said flange, and tightening said assembly until the other end of the tubular body engages said flange.

10. A method of compressing to a predetermined length a helical spring mounted on a bolt or a stud extending from a surface, said method comprising fitting a gauge comprising a tubular body having a radially inwardly extending rim at one end thereof over the spring such that said radially inwardly extending rim engages with the end of the spring remote from the surface, or a washer beyond said end of the spring in a direction away from said surface, providing a nut on said bolt or stud and tightening said nut and bolt or said nut on said stud until the other end of tubular body engages said surface.

11. A method as claimed in claim 10, further comprising removing said gauge when said other end of the tubular member has engaged said surface.

12. An aerial suspension device comprising:
   a clamp comprising two saddle members for engaging a cable on diametrically opposite sides thereof; and
   a plurality of nut and bolt assemblies each including a respective helical spring having a plurality of turns, said assemblies being adapted to extend through aligned holes in respective flanges of said saddle members such that said springs bias the saddle members together in use, the suspension device being configured to increase a force between the two saddle members acting on the cable by increasing the load on the respective helical spring in at least one of the plurality of nut and bolt assemblies by tightening the at least one nut and bolt assembly.

* * * * *